(12) United States Patent
Gelenbe

(10) Patent No.: US 6,804,201 B1
(45) Date of Patent: Oct. 12, 2004

(54) COGNITIVE PACKET NETWORK

(76) Inventor: S. Erol Gelenbe, 100 Detmar Dr., Winter Park, FL (US) 32789

(*) Notice: Subject to any disclaimer, the term of this patent is extended or adjusted under 35 U.S.C. 154(b) by 774 days.

(21) Appl. No.: 09/680,184

(22) Filed: Oct. 5, 2000

(51) Int. Cl.$^7$ ............................................... H04L 12/16
(52) U.S. Cl. ................... 370/255; 370/278; 370/395.21; 370/396; 370/400; 709/226
(58) Field of Search ................................ 370/229, 230, 370/235, 238, 255, 395.21, 396, 400, 408, 231, 278; 709/226

(56) References Cited

U.S. PATENT DOCUMENTS

| | | | |
|---|---|---|---|
| 4,918,690 A | 4/1990 | Markkula, Jr. et al. | |
| 5,142,531 A | 8/1992 | Kirby | |
| 5,263,080 A | 11/1993 | Jones et al. | |
| 5,475,687 A | 12/1995 | Markkula, Jr. et al. | |
| 5,680,551 A | 10/1997 | Martino, II | |
| 5,740,156 A | 4/1998 | Tanabe et al. | |
| 5,812,528 A | 9/1998 | VanDervort | |
| 5,844,888 A | 12/1998 | Markkula, Jr. et al. | |
| 5,936,939 A | 8/1999 | DesJardins et al. | |
| 6,016,319 A | 1/2000 | Kshirsagar et al. | |
| 6,038,216 A | 3/2000 | Packer | |
| 6,038,230 A | 3/2000 | Ofek | |
| 6,039,245 A | 3/2000 | Symonds | |
| 6,041,038 A | 3/2000 | Aimoto | |
| 6,044,062 A | 3/2000 | Brownrigg | |
| 6,289,054 B1 * | 9/2001 | Rhee | 375/240.27 |

OTHER PUBLICATIONS

"Towards Networks with Intelligent Packets" by Erol Gelenbe, Esin Seref and Zhiguang Xhu, 14 Int'l Symposium on Computer & Information Sciences, Oct. 18–20, 1999.

* cited by examiner

Primary Examiner—Dang Ton
Assistant Examiner—Inder Pal Mehra
(74) Attorney, Agent, or Firm—William M. Hobby, III

(57) ABSTRACT

A method of packet switching the packets in a data packet communication environment having a plurality of digital packet transmission stations interconnectable in paths. The steps include causing a first digital packet transmission of a smart data packet at a first end to send one or more smart data packets having a learning algorithm therein for learning a path to a second digital packet transmission station at a second end and then causing an acknowledgement packet to be sent from the second end having the learning path of the smart data packet from the first end to the second end in a reverse path direction to the first end. Then waiting at the first digital packet transmission station for the acknowledgement packet before sending a dumb data packet on the learned path received at the first end from the acknowledgement packet whereby a cognitive packet network is formed by packet switching.

20 Claims, 1 Drawing Sheet

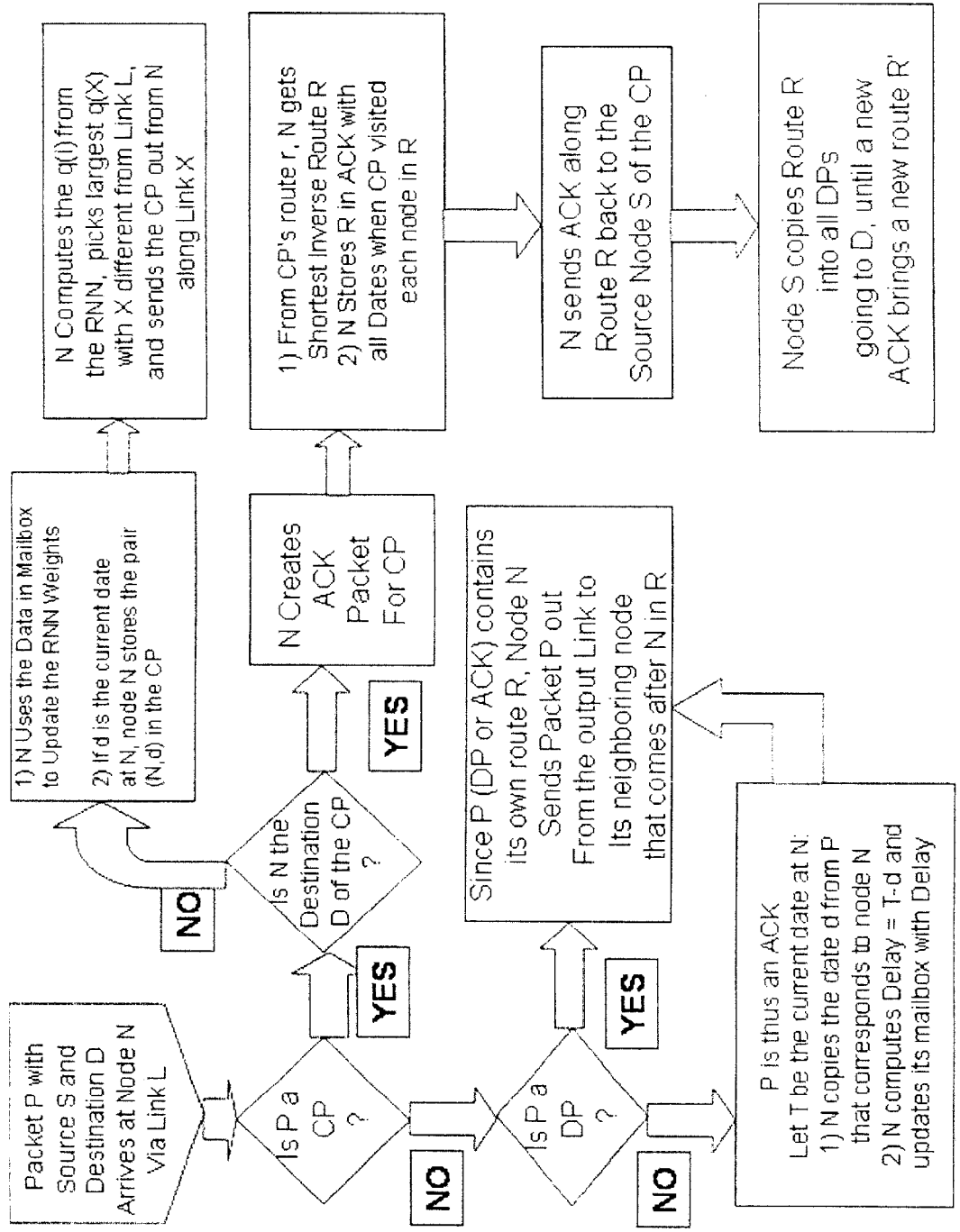

COGNITIVE PACKET NETWORK

BACKGROUND OF THE INVENTION

This invention relates to a cognitive packet network and method of packet switching packets in a data packet communication environment having a plurality of digital packet transmission stations interconnectable in paths.

Most communication networks have been arranged to provide either a connection-oriented service or a connectionless service. In a connection-oriented service, a circuit is established between a source node and a destination node of the network, and all the data transferred between the source node and destination node travels via the links and nodes incorporated in the circuit. The circuit is released only when the call is terminated. Such an arrangement has the advantage that all the data arrives at the destination node in the same order as it is transmitted from the source node. In a connectionless service, data is transmitted between a source node and a destination node via packets or datagrams which each include the address of the destination node and travel along one or more paths through the network to the destination node, the paths chosen generally depend upon the conditions in the network. Accordingly, the packets from the source node can reach the destination node via a multiplicity of paths through the network, each having different delays so that the order in which the packets are received at the destination node does not necessarily correspond to the order in which the packets are transmitted from the source node. Accordingly, facilities are normally required to reorder the data receive by a destination node of such a network.

A wide area network (WAN) is sometimes referred to as a "network of networks". The Internet is a WAN that has become popular.

ARPANET (Advanced Research Projects Agency Network) was the first network in the USA to use packet switching technology. It was set up as an experimental network to investigate system resource sharing in 1969, and has given rise to the Internet which currently connects nodes throughout the world. Routes are generated in the Internet in a distributed fashion. Each node maintains a network database, which includes a complete network topology. The Internet uses datagrams, so that circuits do not have to be construed. Each node calculates a Routing Table (RT) from its delay table and topology database; this routing table contains the best outgoing link to all destination nodes in the network. An end-to-end protocol known as TCP is used to ensure that packets are received at the destination in the correct order, and that losses are detected.

The Internet is based upon a transmission protocol known as "Transmission Control Protocol/Internet Protocol" (or "TCP/IP" for short), which sends packets of data between a host machine, e.g. a sever computer on the Internet, and a client machine, e.g. a user's personal computer connected to the Internet. The World-Wide-Web (WWW) is an Internet interface protocol which is supported by the same TCP/IP transmission protocol.

The following U.S. patents relate to network communications: Prior U.S. Pat. No. 6,038,230 relates to time management in a system in which packets are transmitted only at predetermined clocked instants of time ("pre-defined periodic intervals"), as when dealing with the transmission of voice packets over a network. It describes a scheme for automatically inserting packets into the first available subsequent interval on each pre-determined link, whenever packets are delayed and thus cannot be transmitted within their predetermined time interval.

In contrast, the present invention does not assume that there are any pre-defined periodic time intervals for packet transmission but deals with packet routing through the network rather than with the selection of specific time intervals for packet transmission. It determines adaptively the sequence of nodes and links that a packet must traverse.

In U.S. Pat. No. 6,044,062 to Brownrigg et al., a routing scheme for a wireless network can be used to connect to the Internet. The purpose of the system is to allow "clients" to communicate via wireless with a "server" using data packets, either directly (one hop), or indirectly by communicating via other "clients". It optimizes the communication by seeking to minimize the number of hops, or it can also factor in traffic load and link reliability issues. Each client creates and maintains a route (path) to the server. The routing algorithm portion of this patent specifies that if a client cannot reach a server directly, it probes all of its neighbors. As it does so, if any neighbor has an existing route to a server, then this information will propagate to the server which will add the new client to its routing table. Information about the route can then be forwarded from the immediate neighbor down to the new client so that both the server and the client have the route. The routing scheme proposed here is very similar to the one in U.S. Pat. No. 5,142,531, below, as adapted to the particular wireless environment. Thus the present patent's contribution is related specifically to the broadcasting wireless environment, rather than to routing issues.

U.S. Pat. No. 5,142,531 to Kirby proposes that each node $N_S$ in a packet switching network will contain a table where each row in the table corresponds to a possible destination node, say $N_A$. Each row in the table has two entries. Consider the row corresponding to destination node $N_A$:

the first entry is the name of the immediate neighbor node of $N_S$ which has an ultimate connection to destination $N_A$ with the minimum number of hops (intermediate nodes), the second entry is the name of the immediate neighbor node of which provides the currently known shortest delay from $N_S$ to $N_A$.

The method uses both lists to build a route from source to destination in advance of the actual transmission of a sequence of packets from source to destination. In order to do this, the source sends out a BUILD packet which is routed hop-by-hop (node-by-node) from source to destination according to a very specific scheme.

At any step of BUILD's route, if the next node designated by List 1 and List 2 is the same, then it is selected as the next node. If the two are not identical, then BUILD goes indirectly (i.e. in more than one step) to the node indicated in List 1 which is now included in the route, but first uses the link (next node) designated in the appropriate List 2.

In addition to this specific algorithm used by the BUILD packet, this patent also proposes a manner in which the contents of List 1 and List 2 are to be maintained and updated. All nodes are organized so as to propagate hop count and delay information to all other nodes in a periodic fashion.

Each neighboring node will pass on to its neighbors its known hop count information to its possible destinations, while the receiving neighbor will simply add 1 to that hop count to deduce its own hop count distance to the possible destinations. Presumably the identity of the neighbor having minimum hop count to destination, which is the information stored in List 1, will be selected from all the available values. Delay information will similarly be aggregated by propagating delay information from neighbors and adding to it the link delay between adjacent neighbors. Similarly, the neighbor providing the minimum delay to a destination should presumably be entered into the appropriate row in List 2.

The patent descriptions also indicates that the information communication between nodes will only take place when a nodes own List 1 or List 2 change, and in addition to that a node will confirm periodically to all of its neighbors that it "exists"—i.e. that it is still operational.

In addition to this, when a route is established by a BUILD packet, and the BUILD packet reaches the ultimate destination, and ACKNOWLEDGE packet is sent back to the source so that the source can know that the route is established so that the normal transmission of packets can begin.

In contrast, the present invention uses "cognitive" or "smart" packets to search for routes towards the destination using delay and loss information. When a smart packet traverses the network and enters some node, a specific reinforcement learning algorithm is activated and the delay and loss information is used to determine the appropriate outgoing link from the node. The cognitive packet stores the identity of each successive node it visits. It also stores the sequence of effective transmission delays it experiences and which correspond to the successive nodes it has visited. It can store the delays simply by consulting the clock at a node it leaves before being placed in a link output queue, and then consulting the clock at the node it enters when it is selected for processing by the service mechanism of the node it has reached. This procedure is applied at each new node visited by the cognitive packet (CP) until (1) either the destination is reached, or (2) the total time the cognitive packet has spent in the network without reaching the destination has exceeded a "Time-Out" value.

In the latter case, the cognitive packet is discarded. In the former case an ACK (Acknowledgement) packet is generated by the destination. The ACK contains the inverse route that the ACK will traverse from destination to source, which is merely the inverse of the forward route that the cognitive packet took after removal of the longest cycle (if any) in the route, where "length" of the cycle is expressed to include delay (rather than just the number of hops). The ACK also contains the delay information: the information about delays between adjacent nodes, as experienced by the cognitive packet. As the ACK traverses nodes, it deposits the delay information in the Mailboxes (MB) of the nodes it visits.

Once the ACK reaches the source node, subsequent packets can be forwarded to the destination using the successful route that the ACK has brought back. Subsequent cognitive packets can also use the delay information stored in the intermediate nodes to search for better routes using the same reinforcement learning algorithm.

U.S. Pat. No. 5,142,531 does not address the issue of packet losses which is addressed by the cognitive packet network.

U.S. Pat. No. 5,263,080 to Jones et al. is an improvement on pay telephone systems. U.S. Pat. No. 5,680,551 to Martino, II introduces a uniform messaging interface for heterogeneous applications running on different and/or heterogeneous computing platforms. It does not propose a communication or packet switching mechanism, but can make use of a wide variety of underlying communication mechanisms.

U.S. Pat. No. 5,740,156 to Tanabe et al. pertains to packet switching with fixed length packets such as ATM. It therefore exploits the synchronous nature (clocked) of the communication medium. Encoded header information in the packet is used in each switch to determine the next switch the packet should enter.

It thus requires a fixed network topology (i.e. one in which all nodes are organized with respect to each other in a fixed manner) so that the path from each source to each destination is in fact known in advanced.

U.S. Pat. No. 5,812,528 to VanDervort pertains to packet switching with fixed length packets and specifically ATM. This is a highly standardized connection oriented communication technology which establishes virtual circuits along a pre-selected set of switching nodes. The patent proposes a round trip delay measurement scheme that can be used in optimizing traffic flows in ATM.

U.S. Pat. No. 6,041,038 to Aimoto pertains to packet switching with fixed length packets and specifically to ATM. The scheme described here is one which allows ATM switches to store information about the priority with which cells coming from some particular source may be discarded in case of congestion at the switch. This information is provided to the switches by source units which do not reserve bandwidth but rather indicate cell discard priorities.

U.S. Pat. No. 5,936,939 to DesJardins et al. describes a congestion control mechanism based on discarding packets which contain certain data cells. The mechanism is implemented in special routers or network nodes. The packets which are selected for discarding are those which contain cells pertaining to streams of data which had not been received prior to the enabling of the discarding mechanism for this particular stream. Thus in case of congestion, streams of data which were previously being transmitted are protected, while new incoming streams can be discarded to reduce congestion inside the network.

U.S. Pat. No. 5,844,888 to Markkula Jr. et al. describes a structure of hardware units called "cells" in this patent, but this should not be confused with ATM cells which are small fixed-length packets transmitted in a network. In this patent, these hardware units all have identical architecture and are programmed to carry out different tasks for sensing and control of a distributed system such as a home power distribution system, or a home air conditioning system, or an industrial system, or the like. All of these hardware units typically use a single power system both as their own power supply and as their own communication system to communicate with other hardware units. These hardware units can then be networked through one or several interconnected power systems to achieve sensing and control functions, such as turning lights on and off when it gets dark or light, or turning on air conditioner on and off. The sensor hardware units and the actuator hardware units will typically be at different locations and will communicate with each other.

The communication protocol between cells is closely related to the "random access" or Ethernet type protocols. The technique is based on packet transmission, collision detection and exponential backoff. This is due to the fact that a group of common shared power supply lines are used as the medium for communication. Routes for packets going between different hardware units are established by packet broadcasting from the source hardware unit until the destination cells are reached. Provision is also made for discarding packets which experience a repeated number of collisions in a particular subnetwork. Thus the system operates as an interconnection of Ethernet-like sub-networks (random access), rather than as a meshed packet switching network which is the architecture considered in CPN.

U.S. Pat. Nos. 5,475,687 to Markkula, Jr. et al. and U.S. Pat. No. 4,918,690 to Markkula, Jr. et al. are similar to U.S. Pat. No. 5,844,888. U.S. Pat. No. 6,016,319 to Kshirsagar et al. describes a method for carrying "connectionless" packets or datagrams over an ATM network. ATM networks set up a connection via a set of ATM switches from source to sink and back. On the other hand, the cognition packet network invention describes a "connectionless" technique which differs from IP.

U.S. Pat. No. 6,038,216 to Packer proposes a specific data rate control mechanism destined to modify the existing rate control mechanisms in TCP/IP and uses the delay on acknowledgement packets as a way to modulate the incoming source to destination data rate with a larger delay resulting in a smaller data flow rate. The cognitive packet network on the other hand is a replacement for the IP layer and introduces a different manner to handle routing. Thus in a network operating along the CPN principle, this particular invention could be used as an alternative or variant to TCP, just as TCP or some other technique may be used in conjunction with CPN.

U.S. Pat. No. 6,039,245 to Symonds et al. describes a system designed to deal with messages arriving from a variety of external sources, in a variety of external formats. The external formats are translated into a standard internal message format by software called "message routers" using a relational database. The messages are then routed using the database information to specific message processing programs. The message routers are also used to translate the outgoing messages from the internal format to the specific external format which is needed, and then channeled to external receiving devices. The internal network connection is a standard TCP/IP network while existing public networks are used for external connections.

SUMMARY OF THE INVENTION

The method of switching in a network local area having a plurality of routers for routing data packets between source and destination includes the steps of generating a smart data packet having source and destination data and containing a learning algorithm for learning a route from the source to the destination. The smart data packet is transmitted over the network of routers or nodes from the source to the destination for learning the path of routers from the source to the destination and transferring the learned, path of routers from the smart data packet to an acknowledgement packet. The acknowledgement packet which returns along the reverse learned route of the smart data packet to the source. One or more dumb data packets of data are generated at the source having a predetermined route from the acknowledgement packet which dumb data packets are sent along the predetermined route determined by the smart data packet from the source to the destination to form a cognitive packet network using smart data packets, acknowledgement packets and dumb data packets to transmit data from a source to a destination.

BRIEF DESCRIPTION OF THE DRAWINGS

Other objects, features, and advantages of the present invention will be apparent from the written description and the drawing of a flow diagram of the process.

DESCRIPTION OF THE PREFERRED EMBODIMENT

Cognitive packet networks (CPN) are a novel form of connectionless packet switching. They may be used either in a wide area network or in a local area network. The main advantages of this technology include: (1) giving the control of routing to the users at the software level rather than, as is presently done, to specialized and powerful routing nodes containing specific software and hardware, (2) lowering significantly by at least an order of magnitude the cost of network routers, (3) relating the routing algorithms directly to the quality of service (QoS) desired by the end user, and (4) increasing the robustness of the network to malicious attacks or to accidental network failures.

Cognitive packet networks contain three types of packets: smart packets (SP), dumb packets (DP) and acknowledgment packets (ACKs). A time-out mechanism is also used so that if a packet has been sent out from source (S) at time t and has not reached its destination (D) by time t+d (here d is the time-out delay), then the source considers that the packet has been lost, and the packet itself is destroyed. Time-outs apply to two types of packets (SP and DP). If a packet is timed-out, then it will be retransmitted from its own source for the same destination.

Routers in cognitive packet networks are simple processors with internal input queues and output queues which serve the links connecting a router to its immediate neighbors. Routers in cognitive packet networks also serve as mailboxes for messages deposited by packets and which may be read by other packets. Routers also serve as processing units to execute code on behalf of smart packets.

The smart packets are sent out by the end user to discover routes from source (S) to destination (D). A route is simply an ordered list of routers (or nodes) between the source and the destination. This list may also be expressed as a list of names or identifiers of outgoing links which uniquely define the sequence of link connections through which the packet will travel.

Smart packets use learning algorithms to discover the best routes based on the user's desired quality of service (QoS). The QoS is encoded in a numeric goal (G) that the smart packets try to achieve, such as minimizing packet loss, minimizing delay, a combination of these, or another QoS metric. Each smart packet will begin with some initial routing information, and then develop its own routing information. A smart packet memorizes the route it is taking, and if it successfully reaches its destination (D), it transfers this information to an ACK packet. As the smart packet visits successive nodes or routers, it will also collect time information ("I visted node J at time T(J)").

The ACK packet will return to the source S along the (reverse) path which was discovered by the smart packet. As the ACK travels through the network, it may deposit messages in the mailboxes (MB) of the nodes or routes it visits. The message will typically contain information such as: W(J,K,D)=T(D)−T(J), which is simply the time it took the corresponding smart packet to reach its destination (D) from node J, knowing that after visiting node J, this particular smart packet went to node K on its way to D. This information can be either maintained at the router as it was deposited, or the router can maintain a weighted average of successive values of this information, in which case the mailbox at node J will be updated in the following way:

$$W^*(J,K,D) <= aW^*(J,K,D)+(1-a)W(J,K,D) \quad (1)$$

where "a" is a numeric value between 0 and 1 which is used to weigh the past running average and the most recent value. Here W*(J,K,D) is the estimate of the delay which ends up being stored in the mailbox.

All or some of the dumb packets will also be acknowledged in the same manner. Dumb packets will have a predetermined route. However, they can also collect the information T(J) ("I visited node J at time T(J)") Therefore, the update described in equation (1) may also be carried out and deposited in the routers' mailboxes for ACKs which correspond to dumb packets. The fraction of dumb packets which result in ACKs may be set by the network user for a particular call, for a particular class of packets, or for a particular class of QoS.

Packet loss information will also be gathered in the network. If a packet is sent out at time t, and has not reached its destination at time t+d, then it auto-destroys. This can be accomplished by routers which will discard any packet which arrives to the router bearing a date "t+d", when the date at the router, as observed from its clock, is greater than t+d. Thus, all packets not having reached their destination in d time units after being sent out are considered to have been lost. As is customary in such things, d is chosen to be large enough so that it is significantly larger than the time it should take a packet to reach the destination, plus the time it should take an ACK to get back to the source. In order to keep track of this loss at each node, here is how the packets passing through a node, and the ACKs can modify the running variables, L*(J,K,D), denoting loss, which are deposited in the mailbox for node J.

For the purpose of this definition, successive retransmissions of lost packets traveling through the network are distinguishable: that is, they will contain information saying "I am a new version of packet m", rather than just "I am packet m". Note, that the same smart packet may visit a given node several times if it is being unsuccessful at finding a route; this will appear as the same version, since it does not result from a packet loss.

If the packet is the first (old) version, has destination D, and goes to node K from node J, then at node J, the running variable L*(J,K,D) representing the fraction of lost packets is updated as follows, and then deposited in the mailbox:

$$L*(J,K,D)<=bL*(J,K,D)+(1-b)[L*(J,K,D)\times 100]/101 \quad (2)$$

where "b" is a numeric valve between 0 and 1 which is used to weigh the past running average and the most recent value. Now, if the node receives a packet indicating that it is a new version (to do this, it suffices to set a bit in the packet indicating that the packet was retransmitted), then the running variable is updated as follows:

$$L*(J,K,D)<=bL*(J,K,D)+(1-b)[L*(J,K,D)\times 100+1]/101 \quad (3)$$

Note that the quantity 100 used in (2) and (3) establishes a fictitious counting window of 100 packets which may be increased or decreased to reflect a sufficiently large number. If it is reduced to some number such as 10 or 20, the algorithm will be much more responsive to recent changes. In equations (2) and (3), it may be quite reasonable to set the constant "b" to something very small, in order to provide much greater weight to the recent information.

A smart packet arriving at node J and having destination D will use the contents of the mailbox to make its routing decision. In particular, it will make use of a Goal G which the user has provided to the smart packet. The Goal G is a numeric function to be minimized such as:

$$G=uW+vL \quad (4)$$

to be interpreted as instructions from the user to the smart packet saying "Select your route so as to minimize a combination of delay W and loss L". Here u and v are numeric constants provided by the user.

Thus, at node J, the smart packet which has destination D, will use the information contained in the mailbox to select the next node K. The smart packet may either select the node K which gives the smallest value of the estimated goal G*=uW*(J,K,D)+vL*(J,K,D), or it may use a reinforcement learning algorithm as described in reference [1], or it may use some other learning scheme or estimation technique based on the contents of the mailbox.

While dumb packets contain full routing information which is loaded into them at the source, smart packets may also contain partial routing information (i.e. pieces of routes). When that is the case, the smart packet systematically follows that piece of route whenever it encounters the first node on that pre-specified route.

The route assigned by the source node to a dumb packet will be based on information brought back by the ACKs. Typically, it will be selected by a learning or optimization algorithm which selects the best route to some destination D in much the say way that a smart packet selects the best next node on its path.

Both smart packets and dumb packets contain all the usual fields one would find in usual TCP/IP packets. In addition, they have fields containing the code needed to interact with the nodes they visit (e.g. reading the mailbox, computing the goal, running the reinforcement learning algorithm if needed, formulating a decision about the next node K). When this additional information is discarded, the smart packets and dumb packets can be viewed as ordinary TCP/IP packets. ACKs however are specific to the cognitive packet network framework, though they too are derived form TCP/IP packets.

Thus, the nodes in the cognitive packet network do not need the routing tables or routing algorithms which are typically stored in TCP/IP routers, and therefore can be implemented with much simpler and less costly hardware and software than conventional TCP/IP routers.

A flow diagram of the process is illustrated in the drawing in which:

"S"=source node,

"D"=destination mode,

"P"=any packet,

"DP"=payload or dumb packet,

"CP"=smarter cognitive packet, and

"ACK"=acknowledgement packet.

An alternate usage of Cognitive Packet Network Technology is to build private user networks which are implemented on top of existing TCP/IP, Asynchronous Transfer Mode, or other types of networks.

The decision algorithm used in this invention for routing of smart or cognitive packets using a learning algorithm is based on the concept of reinforcement learning. Reinforcement learning has been suggested and used to control a system adaptively so that past successes or failures of the system can be used to improve future performance. An algorithm based on the principle of reinforcement learning will update the internal information stored by the algorithm in order to record successes or failures related to decisions taken in the past. Thus, failures will be recorded in a manner which will "punish" outcomes which have lead to poor performance, while successes will be recorded in a manner which will "reward" outcomes which have given rise to good performance. Typically, reinforcement learning is integrated into some artificial neural network based algorithm. Artificial neural networks are mathematical representations which mimic in a simplified manner certain salient characteristics of natural (biological) nerve cells. One such artificial neural network model is the random neural network (RNN) model (Towards Networks with Intelligent Packets, by Erol Gelenbe, Esin Seref and Zhiguang Xhu, 14th International Symposium on Computer and Information Sciences, Oct. 18–20, 1999) which was introduced by E. Gelenbe and which is used in the present invention. Specifically, in order to implement cognitive packet network routing we have used reinforcement learning in conjunction with the random neural network model.

The random neural network is a network composed of a finite set of units or neurons which has previously been used in a variety of applications, including the texture based identification and measurement of tissues in magnetic resonance images of the brain. In a previous patent, the learning algorithm used is based on so-called gradient descent of a cost function, and describes this learning algorithm, which entails the computation of derivatives of the cost or objective function with respect to network parameters for each observation. It falls under the general name of "backpropagation learning" or "gradient descent learning".

On the other hand, the reinforcement learning (RL) algorithm modifies the neural network parameters directly in proportion to observed values of the cost, in our case the Goal G which is calculated from a weighted sum of observed delays and packet losses encountered by packets in the past which may have selected the same route.

To describe this algorithm, let us number the neurons in a generic random neural network from 1 to N. The indices I and J will be used to denote selected neurons in the network. Each neuron is a cell which has an internal numerical value, and this value may vary between 0 and 1. If that value is 1, then the cell is "excited" while if it is 0 the cell is quiescent. In the random neural network, this internal value can vary continuously between 0 and 1.

The internal value of some neuron I will be denoted by q(I). Each cell I can receive some outside excitatory stimulus which is a non-negative real number denoted by L(I). Each cell I has an internal parameter which we call its firing rate and which is denoted by R(I).

The cells or neurons in the random neural network affect each other in a very specific manner via "weights" which are non-negative real numbers. Weights are directional, so that weights linking neuron I to neuron J will, in general, differ from those linking J to I.

A weight from cell I to cell J can have an inhibitory effect on a neuron, in which case we will denote it by $w^-$ (I,J), or it can have an excitatory effect, in which case it will be denoted by $w^+$ (I,J). In the random neural network, the parameter R(I) and these weights are related in a fixed manner by the following formula:

$$R(I) = w^+(I,1) + w^+(I,2) + \ldots + w^+(I,N) + w^-(I,1) + w^-(I,2) + \ldots + w^-(I,N)$$

or in other words, the firing rate of any neuron I is simply the sum of all the outgoing excitatory and inhibitory weights from neuron I to all the other neurons.

In the random neural network which we use for reinforcement learning, the interaction between neurons or cells is described in an unique manner by the simple equations which are a basic property of this specific neural network model:

$$q(I) = \frac{L + q(1)w^+(1,I) + q(2)w^+(2,I) + \ldots + q(N)w^+(N,I)}{R(I) + q(1)w^-(1,I) + q(2)w^-(2,I) + \ldots + q(N)w^-(N,I)}$$

where L is a common level of input applied to all of the cells, and which is constant and does not vary with the learning algorithm. In other words, the internal numerical variable or state q(I) of any neuron I can be obtained by calculating the ratio of two quantities. In the denominator of this ratio, we will have the sum of the external excitatory stimulus L plus all the effects of all the other neuron states weighted by the excitatory weights linking all other neurons to neuron I. In the denominator, the neuron's firing rate is summed with the effect of all the other neuron states weighted by the inhibitory weights linking the other neurons to neuron I. As a result, the valve of q(I) will become larger when neuron I is affected by an excitatory connection from some highly excited neuron, and will become smaller when it is affected by an inhibitory link from some highly excited neuron.

The learning and decision algorithm for cognitive packet routing can use the random neural network in the following manner. Each neuron of the random neural network is associated with a specific output link or port in a given network routing node. The decision to send a given packet out on a specific link or port I will result from the fact that its associated neuron is the most excited (largest value of q(I)) among all the neurons which correspond to the ports of that node. In other words, at a specific routing node, the decision to send out a packet on output link I results simply from that act that the value q(I) is the largest one among all internal states of the neurons of the random neural network which are associated with the output links at that routing node.

However, this decision will only be made after the reinforcement learning (RL) algorithm is run for that specific packet at that particular node. This is done as follows: First, the numerical value of the Goal G is calculated from the weighted sum of the Delay W and the loss L (G=αW+βL) for each of the output ports 1, . . . , N at that routing node. Note that the information being used are the delay and loss information stored in that node's mailbox, and more specifically, the delay and loss information brought back to that node by acknowledgement packets for packets which had the same destination as the particular packet for which a decision is being currently sought, and updated using (1), (2), (3). Let us denote by G(J) for J=1, . . . , N the resulting values of the goal for each of the possible output links J=1, . . . , N for that packet. Once all the G(J) are calculated, the RL proceeds by using this information to penalize those choices of output links which, from past experience, have resulted in large values of G.

Thus, the reinforcement learning algorithm will increase all inhibitory weights $w^-$ (I,J) by a factor proportional to G(I) and reduce all excitatory weights $w^+$ (I,J) by a factor proportional to G(J). The numerical normalization described in equation (4) of "Towards Networks with Intelligent Packets", supra, is meant to avoid having to deal with excessively large weights, which could lead to numerical difficulties in running the algorithm. The result of the described weight procedure is that the random neural network will have a smaller tendency to recommend output links which have resulted in the past in a larger value of G, and to the contrary, will tend to favor output links which have resulted in smaller values of G. The accumulation of this information over time after each successive update, embodies the learning aspect of this algorithm. Its effect is to modify the internal values of the neurons. Thus, a neuron I will have a larger value of its internal state q(I) if it indicates an outcome which has resulted to a smaller value of the Goal G in the recent past, and therefore, that outcome will be selected over another neuron J with a smaller value of G(J).

I claim:

1. A method of packet switching in a network having a plurality of routers for routing data packets between source and destination including the steps of:

generating a smart data packet having source and destination data and containing a learning algorithm for learning a route from the source to the destination;

transmitting said generated smart data packet over said network of routers from said source to said destination for learning a path of routers from said source to destination;

transferring said path of routers learned from said smart data packet to an acknowledgement packet;

transmitting said acknowledgement packet along a reverse route of the path of routers transferred from said smart data packet to said acknowledgement packet;

generating a dumb data packet of data at said source having the predetermined route from said acknowledgement packet; and sending said dumb data packet along the predetermined route determined by the smart data packet from the source to the destination;

whereby a network uses smart data packets, acknowledgement packets and dumb data packets in the transmission of data from a source to a destination.

2. A method of packet switching in accordance with claim 1 including the step of generating a time out code in said smart data packet to determine when to retransmit a packet which has not reached its destination within a predetermined time delay.

3. A method of packet switching in accordance with claim 2 including a step of generating a time out code in said dumb data packet to determine when to retransmit a packet which has not reached its destination within a predetermined time delay.

4. A method of packet switching in accordance with claim 2 in which each router of said network of routers has a computer possessing unit having input and output queues connecting each said router to its immediate neighboring router and including a step of routing each packet through a plurality of routers.

5. A method of packet switching in accordance with claim 4 in which each router of said network of routers has a mailbox therein and including a step of encoding each said smart data packet to interact with a visited router to read a mailbox message therein.

6. A method of packet switching in accordance with claim 5 including the step of encoding each said smart data packet to interact with a visited router to formulate a decision about the choice of a next router on its path.

7. A method of packet switching in accordance with claim 6 including a step of encoding each said smart data packet to interact with a visited router to compute a destination for the smart data packet.

8. A method of packet switching in accordance with claim 7 in which each router of said network of routers has a mailbox therein and including a step of encoding each said dumb data packet to interact with a visited router to read a mailbox message therein.

9. A method of packet switching in accordance with claim 8 including a step of encoding each said dumb data packet to interact with a visited router to formulate a decision about the next router.

10. A method of packet switching in accordance with claim 9 including a step of encoding each said dumb data packet to interact with a visited router to compute a destination for the dumb data packet.

11. A method of packet switching in accordance with claim 2 in which the step of generating a time out code includes generating a code to determine if a packet sent out from at a source has not reached its destination by a source time plus a predetermined delay time to retransmit the packet.

12. A method of packet switching packets in a data packet communication environment having a plurality of digital packet transmission stations interconnectable in paths including the steps of:
    causing a first digital packet transmission of a smart data packet from a first digital packet transmission station at a first end to send at least a first smart data packet having a learning algorithm therein for learning a path to a second digital packet transmission station at a second end;
    causing an acknowledgement packet to be sent from said second end having the learned path of said smart data packet from said first end to said second end in a reverse path direction to said first end;
    waiting at a first digital packet transmission station for said acknowledgement packet before sending a dumb data packet on the learned path received at said first end from said acknowledgement packet, whereby a packet switching network reduces the cost and complexity in the nodes of a network.

13. A method of packet switching packets in a data packet communication environment in accordance with claim 12 including a step of generating a time out code in said smart data packet to determine when to retransmit a packet which has not reached its destination within a predetermined time delay.

14. A method of packet switching packets in a data packet communication environment in accordance with claim 13 including a step of generating a time out code in said dumb data packet to determine when to retransmit a packet which has not reached its destination within a predetermined time delay.

15. A method of packet switching packets in a data packet communication environment in accordance with claim 12 in which the step of generating a time out code includes generating a code to determine if a packet sent out at a source time has not reached its destination by the source time plus a predetermined delay time to retransmit the packet.

16. A method of packet switching packets in a data packet communication environment in accordance with claim 12 in which each said network digital packet transmission station has a computer possessing unit having input and output queues connecting each said digital packet transmission station to its immediate neighboring digital packet transmission station and including a step of routing each packet through a plurality of digital packet transmission station.

17. A method of packet switching packets in a data packet communication environment in accordance with claim 16 in which each said network digital packet transmission station has a mailbox therein and including the step of encoding each said smart data packet to interact with a visited digital packet transmission station to read a mailbox message therein.

18. A method of packet switching packets in a data packet communication environment in accordance with claim 17 including a step of encoding each said smart data packet to interact with a visited digital packet transmission station to compute a destination for the smart data packet.

19. A method of packet switching packets in a data packet communication environment in accordance with claim 18 including a step of encoding each said dumb data packet to interact with a visited digital packet transmission station to formulate a decision about the next digital packet transmission station.

20. A method of packet switching packets in a data packet communication environment in accordance with claim 19 including a step of encoding each said dumb data packet to interact with a visited digital packet transmission station to compute a destination for the dumb data packet.

* * * * *